United States Patent
Armstrong et al.

(10) Patent No.: US 12,421,692 B2
(45) Date of Patent: Sep. 23, 2025

(54) HOUSE SWING SENSOR FOLLOWER PINION

(71) Applicant: Caterpillar Inc., Peoria, IL (US)

(72) Inventors: Vincent A. Armstrong, Mooresboro, NC (US); Joshua David Callaway, Cary, NC (US); Christopher E. Bright, Raleigh, NC (US); Benjamin J. Terry, Wilson, NC (US)

(73) Assignee: Caterpillar Inc., Peoria, IL (US)

( * ) Notice: Subject to any disclaimer, the term of this patent is extended or adjusted under 35 U.S.C. 154(b) by 662 days.

(21) Appl. No.: 17/742,079

(22) Filed: May 11, 2022

(65) Prior Publication Data

US 2023/0366172 A1    Nov. 16, 2023

(51) Int. Cl.
   *E02F 9/12*     (2006.01)
   *E02F 9/26*     (2006.01)
   *F16H 19/08*    (2006.01)
   *F16H 55/06*    (2006.01)
   *G01D 5/14*     (2006.01)

(52) U.S. Cl.
   CPC .............. *E02F 9/123* (2013.01); *E02F 9/26* (2013.01); *F16H 19/08* (2013.01); *F16H 55/06* (2013.01); *G01D 5/142* (2013.01)

(58) Field of Classification Search
   CPC .. E02F 9/123; E02F 9/26; E02F 9/264; F16H 1/10; F16H 19/08; F16H 55/06; G01D 5/142
   See application file for complete search history.

(56) References Cited

U.S. PATENT DOCUMENTS

| | | | | |
|---|---|---|---|---|
| 5,448,148 A | * | 9/1995 | Devier | G05B 19/404 318/645 |
| 5,996,429 A | * | 12/1999 | Stickling | G01P 1/08 73/866.1 |
| 6,052,636 A | * | 4/2000 | Lombardi | E02F 9/2025 318/645 |
| 7,746,067 B2 | | 6/2010 | Brandt et al. | |
| 8,836,323 B2 | | 9/2014 | Most et al. | |
| 9,328,801 B2 | * | 5/2016 | Vanneste | F16H 1/10 |
| 2019/0263236 A1 | * | 8/2019 | Searfoss | B60J 7/104 |
| 2020/0299929 A1 | | 9/2020 | Ohiwa et al. | |
| 2020/0331729 A1 | | 10/2020 | Tokutome et al. | |
| 2021/0197782 A1 | * | 7/2021 | Carrara | B60T 13/74 |
| 2021/0340729 A1 | | 11/2021 | Sulzer | |

FOREIGN PATENT DOCUMENTS

| | | |
|---|---|---|
| EP | 1911717 | 3/2011 |
| JP | S6074751 | 4/1985 |
| KR | 960013595 | 10/1996 |

OTHER PUBLICATIONS

Extended European Search Report for European Patent Appln. No. 23169342.5, mailed Sep. 20, 2023 (5 pgs).

* cited by examiner

Primary Examiner — Tyler J Lee

(57) ABSTRACT

A follower pinion apparatus can include a swing gear system comprised of a swing gear and a swing motor pinion. The follower pinion apparatus can also include a nonmetallic follower pinion positioned to mesh with the swing gear and a sensor configured to sense a position of the follower pinion.

19 Claims, 8 Drawing Sheets

HOUSE SWING SENSOR FOLLOWER PINION

TECHNICAL FIELD

This disclosure relates to construction equipment, and more specifically to a system and method for determining house swing rotation in construction equipment.

BACKGROUND

Many machines include one or more components that rotate relative to one another. For example, excavators include a house disposed on top of a lower frame or undercarriage, with the house rotatable with respect to the undercarriage. These machines may include a positioning system that includes a motor that rotates a gear assembly associated with a swing gear train, which in turn, rotates the house. There is a general need to improve the accuracy at which the rotation is determined, so that the house can more accurately rotate to the desired position. There is also a general need for an accurate rotation measurement system that can be retrofitted to existing machines.

Sensors can monitor the actual position of the house and accuracy of the sensors can improve reliability for some control applications. Some machines include a position-sensing system with a sensor that generates a signal related to proximity of the sensor element to a component or to a projection of a component, such as a gear tooth. Other position-sensing systems may include a sensor that senses rotational movement of a component, such as a gear. Unfortunately, a number of factors may cause significant variations in the values of the signals generated by such sensors. For example, vibrations, temperature variations, variations in the characteristics of the sensor and/or variations in the characteristics of power supplied to the sensor may increase or decrease the sensor signal value. Because of variations in such parameters, a position-sensing system employing one or more sensors may be inaccurate and therefore more robust position-sensing systems are needed U.S. Pat. No. 8,836,323 discusses a slew position sensing system that includes a swing sensor housing coupled to a rotary position sensor or speed sensor to detect rotation of target gear.

SUMMARY OF THE INVENTION

In an example according to the present disclosure a follower pinion apparatus can include a swing gear system comprised of a swing gear and a swing motor pinion; a nonmetallic follower pinion positioned to mesh with the swing gear; and a sensor configured to sense a position of the follower pinion.

In another example according to this disclosure, a work machine can include an upper structure and a lower structure; a swing gear system coupled to the upper structure and to the lower structure, the swing gear system configured to rotate the upper structure over the lower structure using a swing motor; and an upper frame within the upper structure, the upper frame including a swing sensor aperture at which is mounted a nonmetallic follower pinion assembly.

In another example according to this disclosure, a method for sensing swing gear rotation in a work machine can include providing a follower pinion sensor housing including a nonmetallic follower pinion and a position sensor; providing an aperture with an upper frame of the work machine, the aperture to mesh with a pitch center diameter of a swing gear system of the work machine; installing the follower pinion sensor housing in the aperture; and detecting swing gear rotation based on a position of the follower pinion.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
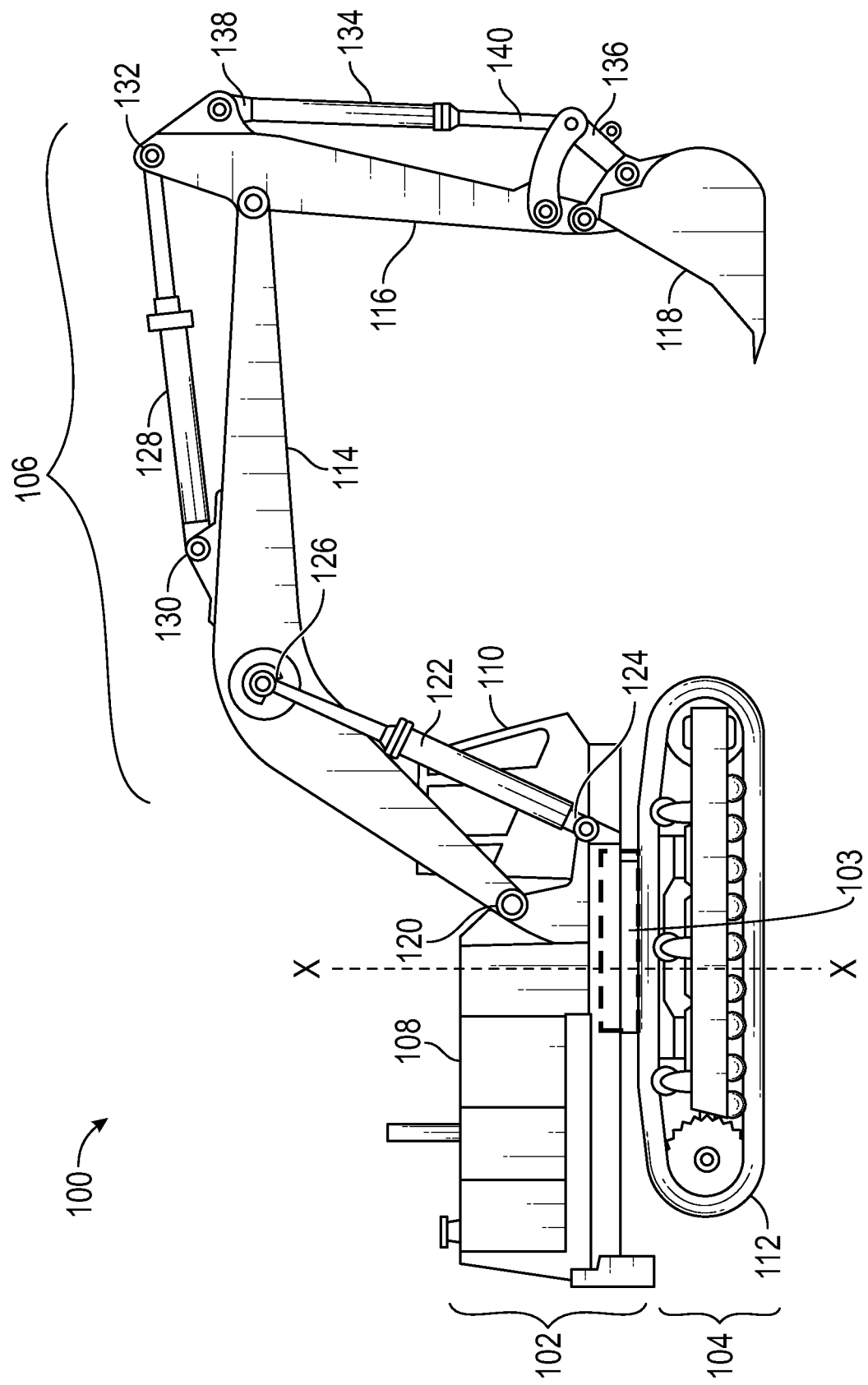
FIG. 1 shows a side view of an excavator, in accordance with this disclosure.

FIG. 1 shows a side view of an excavator 100, in accordance with this disclosure. While example embodiments are described with reference to an excavator 100, examples according to this disclosure are applicable to a variety of types of work machines, including cranes or other machines in which an attached body rotates (using, e.g., a gear, bearing or sprocket mechanism) relative to another body of the work machine.

Referring to FIG. 1, an excavator 100 may include an upper structure 102, a lower structure 104 and a working element 106. The upper structure 102 may include a body 108 and an operator cab 110. The operator cab 110 is mounted on the body 108. The operator cab 110 may include devices that receive input from a machine operator which may indicate a desired maneuvering of the excavator 100. Specifically, the operator cab 110 may include one or more operator interface devices. Examples of operator interface devices include, but are not limited to, a joystick, a travel control lever, and/or a pedal (none of which are shown but are well known in the industry).

The lower structure 104 may comprise a pair of tracks 112, to drive the excavator 100 on a path. The pair of tracks 112 may be driven by a hydrostatic transmission or by electric travel motors which, in turn, are powered by a prime mover such as an internal combustion engine (not shown).

The working element 106 includes a boom 114, an arm 116, and a work tool 118. The boom 114 may be mounted on the body 108 at a pivot point 120. The boom 114 is made to vertically pivot by means of a boom hydraulic cylinder 122. A first end 124 of the boom hydraulic cylinder 122 may be coupled to the body 108. A second end 126 of the boom hydraulic cylinder 122 may be coupled to the boom 114. The boom 114 may be coupled to the arm 116.

The arm 116 is moved with respect to the boom 114 by extending or retracting an arm hydraulic cylinder 128. A first end 130 of the arm hydraulic cylinder 128 is coupled to the boom 114. A second end 132 of the arm hydraulic cylinder 128 is coupled to the arm 116. The arm 116 may further be coupled to the work tool 118.

The work tool 118 is moved with respect to the arm 116 by extending or retracting a work tool hydraulic cylinder 134. The work tool hydraulic cylinder 134 moves the work tool 118 via a bucket linkage assembly 136. A first end 138 of the work tool hydraulic cylinder 134 may be coupled to the arm 116. A second end 140 of the work tool hydraulic cylinder 134 is coupled to the bucket linkage assembly 136. In an embodiment, the bucket linkage assembly 136 may be referred as a work tool linkage assembly and may be used to couple any type of work tool.

Numerous different work tools 118 may be attached to the excavator 100 and may be controlled by the machine operator. Work tool 118 may include any device used to perform a particular task, such as a blade, a fork arrangement, a bucket (shown in FIG. 1), a shovel, a ripper, a broom, a propelling device, a cutting device, a grasping device, and/or any other task-performing device known in the art.

The upper structure 102 may use swing gear (generally placed around element 103) to rotate with respect to lower structure 104 about an axis X. Further detail regarding the swing gear 103 is provided later herein. Available systems for determining the amount of this rotation (slew) may be imprecise or may require replacement of costly components such as the hydraulic swivel or swing motor. In available systems, Hall Effect sensors measure rotation of a swing gear pinion (not shown in FIG. 1), and therefore precision is limited by the number of teeth on the swing gear pinion. To address these and other concerns, systems, apparatuses and methods according to some embodiments can provide a separate, nonmetallic pinion (e.g., a "follower pinion") that meshes with the swing gear and that follows rotation of the swing motor pinion, so that measurement precision is not limited by or dependent on the number of teeth on the swing gear pinion. Motion and position of this follower pinion can then be detected and used to determine house swing rotation. This assembly can be retrofitted to an existing machine. Description of the follower pinion assembly, and placement of the follower pinion assembly, is provided below.

Figure 2:
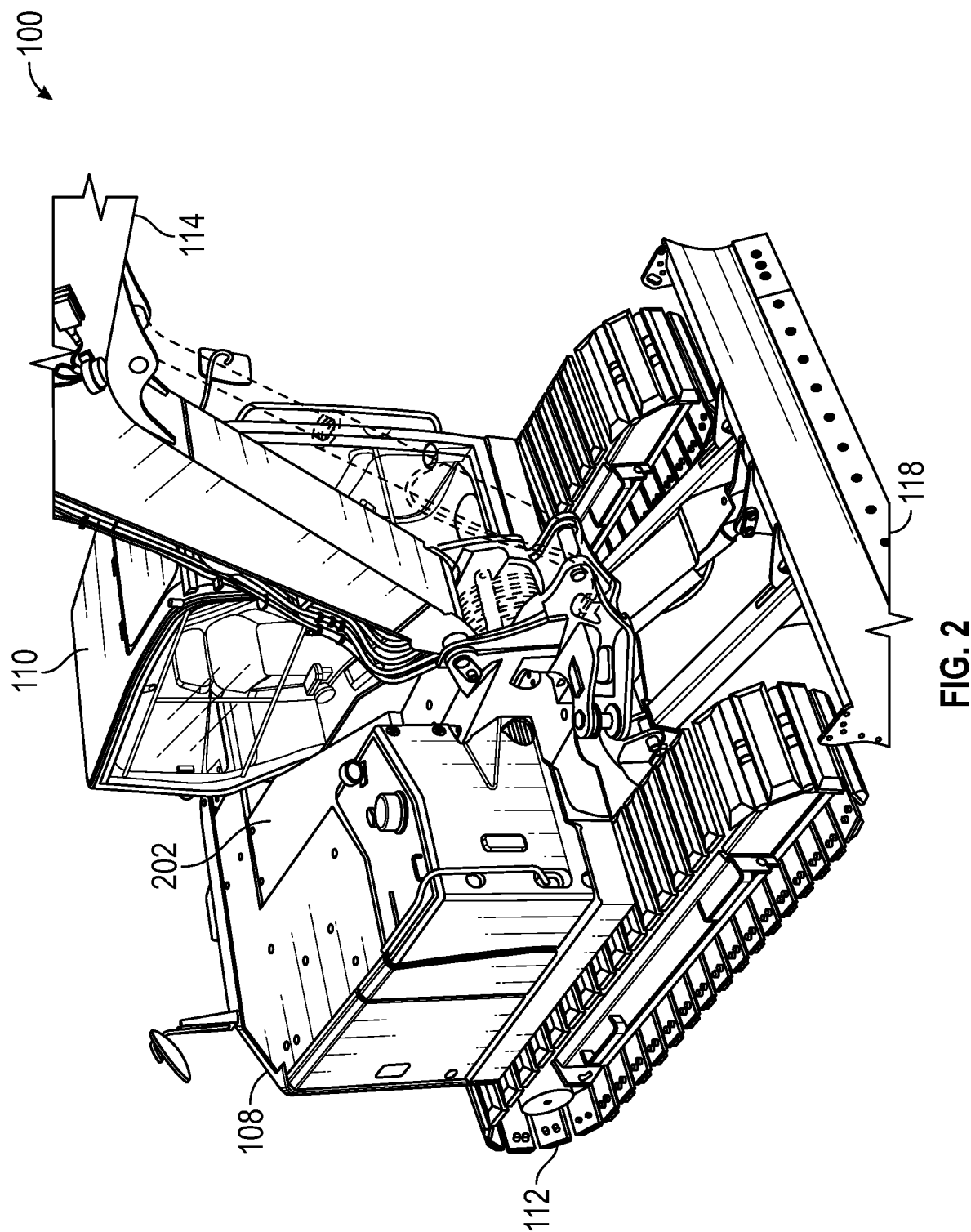
FIG. 2 shows a perspective view of an excavator in accordance with this disclosure.

FIG. 2 shows a perspective view of the excavator 100 in accordance with this disclosure. Certain elements of FIG. 2 were separately described with reference to FIG. 1 and are numbered similarly as FIG. 1 where appropriate. The perspective view is provided for depiction of center enclosure panel 202. The follower pinion swing sensor location can be primarily identified when the center enclosure panel 202 is removed. The center enclosure panel 202 can be regularly accessed for service and installation of aftermarket sensing systems.

Figure 3:
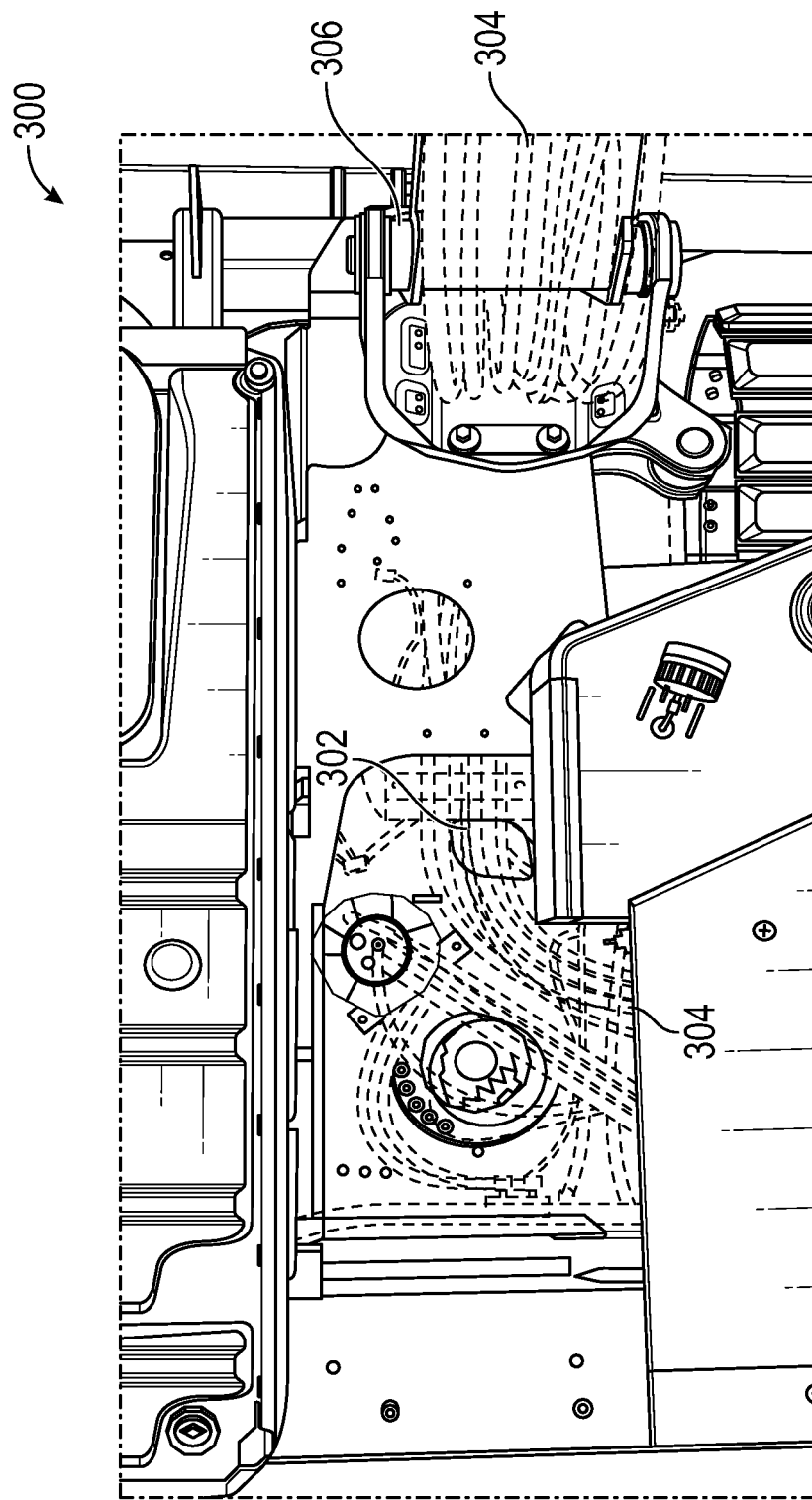
FIG. 3 shows a top view of an upper frame of an excavator in accordance with this disclosure.

FIG. 3 shows a top view of an upper frame portion 300 of an excavator in accordance with this disclosure. The view depicts the upper frame portion 300 after the center enclosure panel 202 (FIG. 2) has been removed. After removing the center enclosure panel 202, the location 302 of a follower pinion swing sensor (or cover if the follower pinion swing sensor is not installed) can be seen under hydraulic hoses 304 routing toward a boom (e.g., boom 114 (FIG. 1). Boom swing casting 306 can be located below pivot point 120 (FIG. 1), e.g., between pivot point 120 and tracks 112.

Figure 4A:
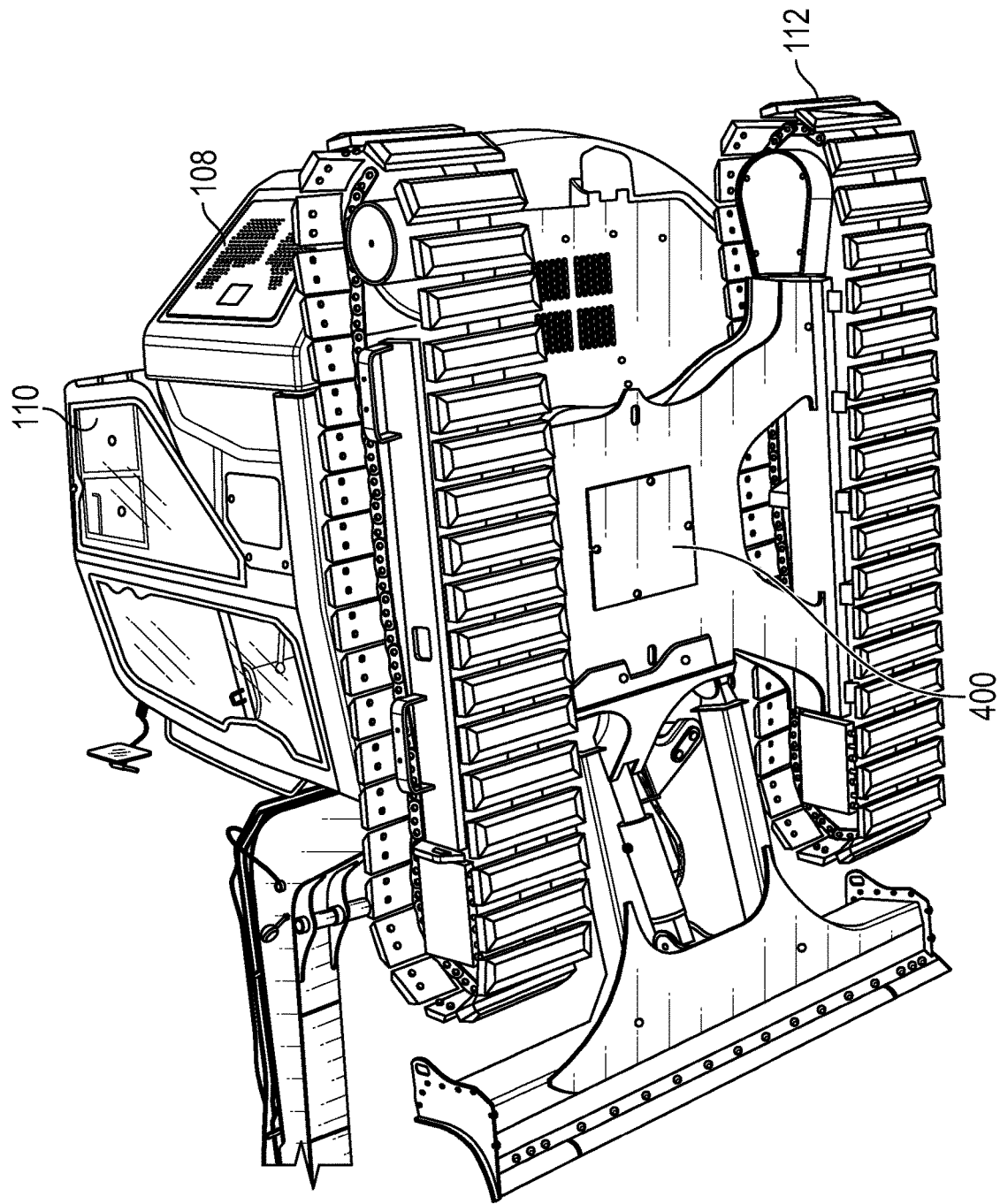
FIG. 4A shows a lower frame swivel access panel of an excavator in accordance with this disclosure.

FIG. 4A shows a lower frame swivel access panel 400 of an excavator in accordance with this disclosure. Certain portions of the excavator 100 are the same as portions depicted and described with reference to FIG. 1 above and accordingly similar reference numerals as FIG. 1 may be used in FIG. 4A. As shown in FIG. 4A, a follower pinion swing sensor location can be discovered by removing the lower frame swivel access panel 400. The lower frame swivel access panel 400 is less commonly removed than the panel 202 but does provide an additional access point that the follower pinion assembly could be discovered.

Figure 4B:
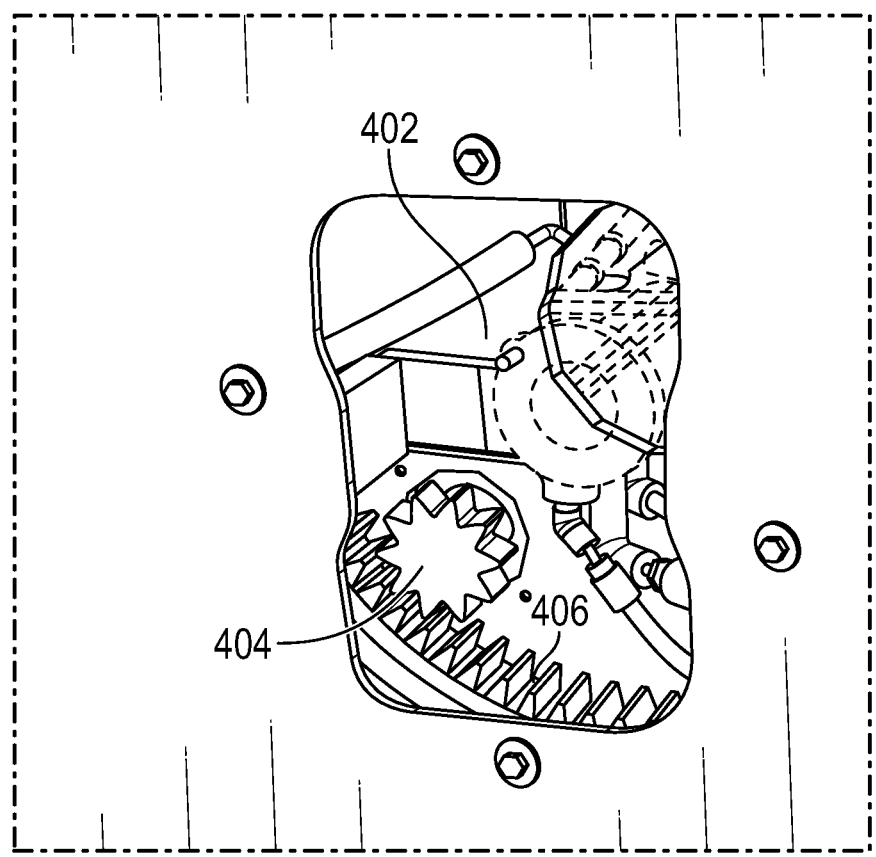
FIG. 4B shows a follower pinion swing sensor with the swivel access panel removed in accordance with this disclosure.

FIG. 4B shows a follower pinion apparatus 402 with the swivel access panel removed. Follower pinion 404 meshes with swing gear 406. As described later herein, a sensor (not shown in FIG. 4B) detects motion of the follower pinion 404 and provides information on motion of the follower pinion to a controller, which deduces rotation of swing gear 406.

Figure 5A:
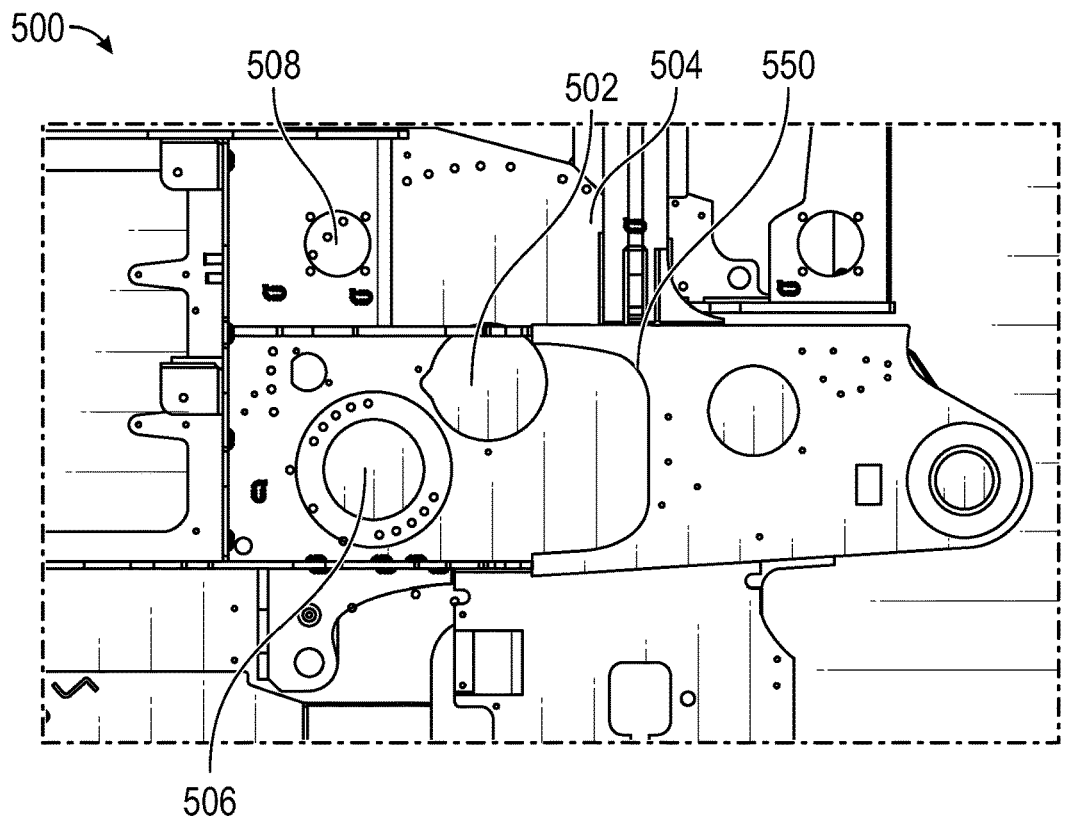
FIG. 5A shows an upper frame without sensor mounting provisions in accordance with this disclosure.

FIG. 5A shows an upper frame portion 500 without sensor mounting provisions in accordance with this disclosure. The upper frame portion 500 can be similar to upper frame portion 300 (FIG. 3). The upper frame portion 500 includes a swivel clearance aperture 502. A swivel (not shown in FIG. 5A) comprises a fluid transfer mechanism that allows hydraulic oil to flow from the upper frame portion 500 to a lower frame (e.g., lower structure 104 (FIG. 1). The top section 504 rotates relative to lower frame.

The upper frame portion 500 further includes a swing motor mounting aperture 506. A swing motor (not shown in FIG. 5A) comprises a hydraulic mechanism that rotates the upper frame portion 500 about the lower frame (not shown in FIG. 5A). Swing gear/bearing mounting apertures 508 are also provided. A swing gear/bearing (not shown in FIG. 5A) provides a load carrying aspect of rotation and is provided with mounting apertures to both upper frame portion 500 and lower frame.

Figure 5B:
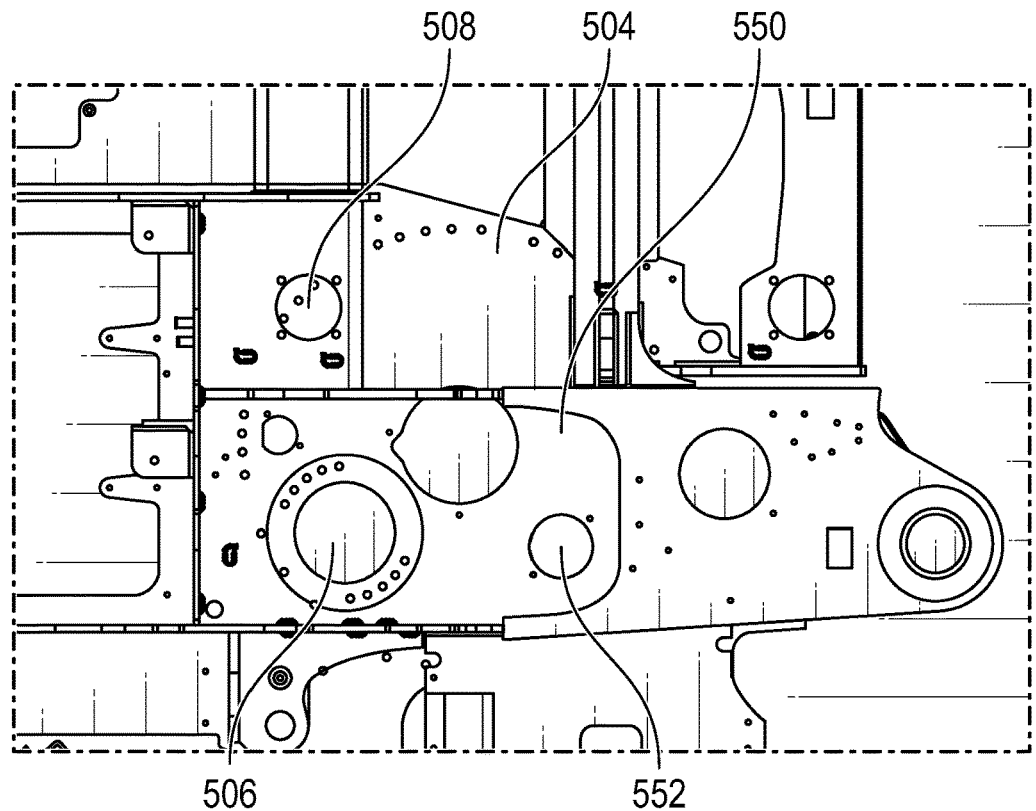
FIG. 5B shows an upper frame with sensor mounting provisions in accordance with this disclosure.

FIG. 5B shows an upper frame portion 550 with sensor mounting provisions in accordance with this disclosure. Features of FIG. 5B are as described with respect to similarly numbered features of FIG. 5A. The upper frame portion 550 can be similar to upper frame portion 300 (FIG. 3). In comparison to FIG. 5A, the upper frame portion 550 further includes a follower pinion swing sensor mounting aperture 552. Follower pinion sensor mounting aperture 552 comprises an additional machined aperture that meshes directly into the swing gear pitch center diameter (not visible in FIG. 5B). Currently available solutions provide an aperture similar to aperture 552 to provide access to Hall effect sensing solutions for sensing swing gear rotation. However, as mentioned earlier herein, Hall effect-based sensing solutions are less accurate and less precise than follower pinion-based solutions according to aspects of the disclosure.

Instead of measuring rotation of swing gear using Hall effect sensing solutions, systems, methods and apparatuses according to aspects of the disclosure kinematically compute the house swing rotation using a nonmetallic follower pinion that meshes with the swing gear and follows the rotation driven by the swing motor pinion.

Figure 6:
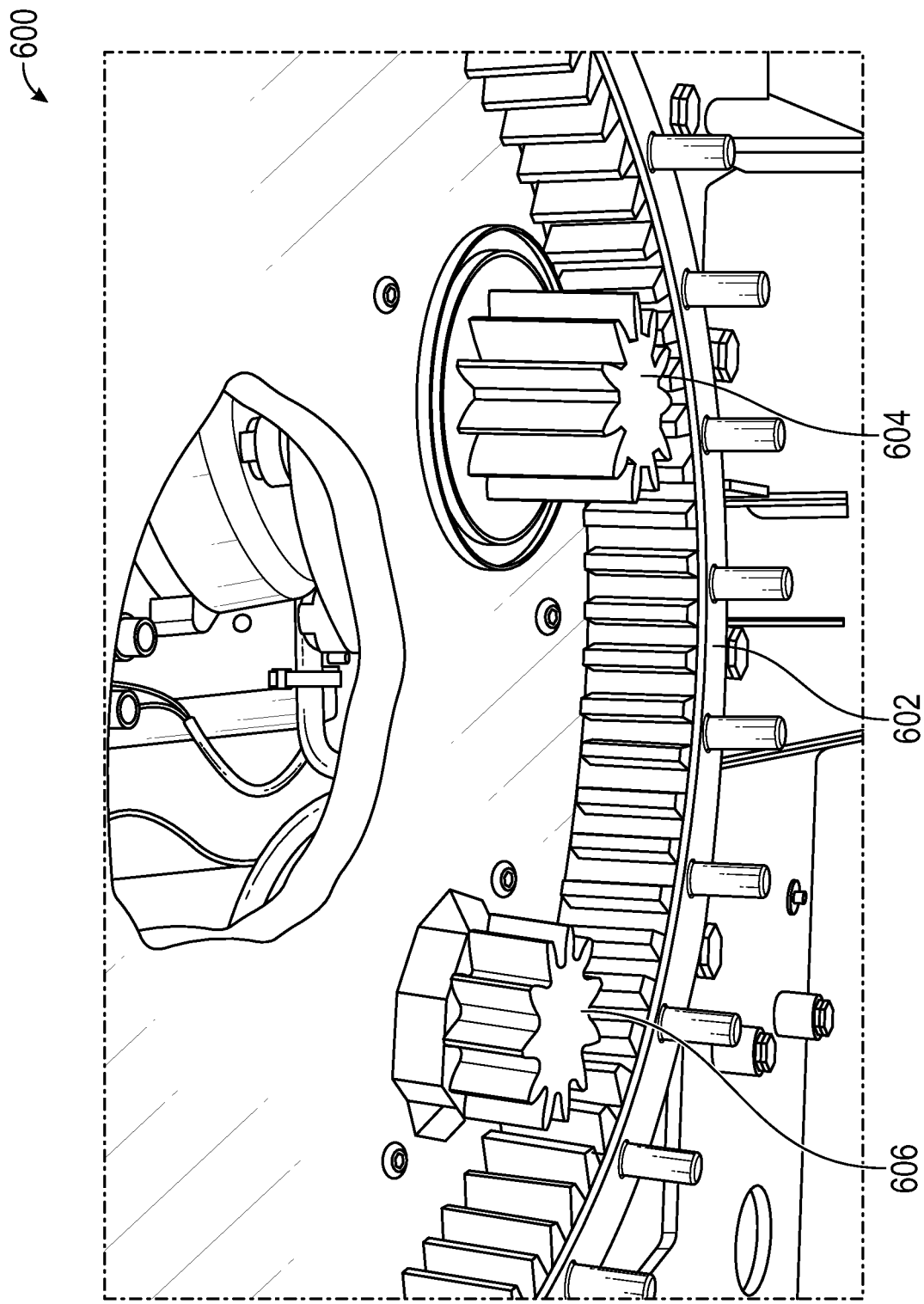
FIG. 6 shows a follower pinion meshed with a swing gear in accordance with this disclosure.

FIG. 6 shows a follower pinion apparatus 600 in accordance with this disclosure. The follower pinion apparatus 600 includes a swing gear system comprised of a swing gear 602 and a swing motor pinion 604. The follower pinion apparatus 600 further includes a follower pinion 606 that meshes with the swing gear 602. The follower pinion 606 can be placed in the same locating diameter as the swing motor pinion 604 although embodiments are not limited thereto, and the follower pinion 606 and swing motor pinion 604 can have varying numbers of teeth. Further, similarly to the swing motor pinion 604, the follower pinion can be designed as an involute gear design and having a same or lower backlash than the swing motor pinion 604. In some examples, the swing gear 602 includes a pitch center diameter (not depicted in FIG. 6) and the swing sensor aperture 552 (FIG. 5B) is positioned to mesh to the pitch center diameter.

The follower pinion apparatus 600 further includes a sensor 702 (FIG. 7) configured to sense a position of a follower pinion 704. As the follower pinion 704 follows the swing gear 602 (as shown with follower pinion 606 (FIG. 6)), the sensor 702 can detect position of the follower pinion 704 and measurements therefore can be used to determine house swing rotation. Measurement can be continuous (as opposed to discrete) because the measurements do not rely on detection of a number of gear teeth but rather on the continuous rotation of the follower pinion 704 within the swing gear 602. Furthermore, apparatuses according to embodiments can reduce or eliminate measurement errors that can occur due to misalignment of the swing gear 602 and can provide flexibility in mounting of the swing gear 602.

Figure 7:
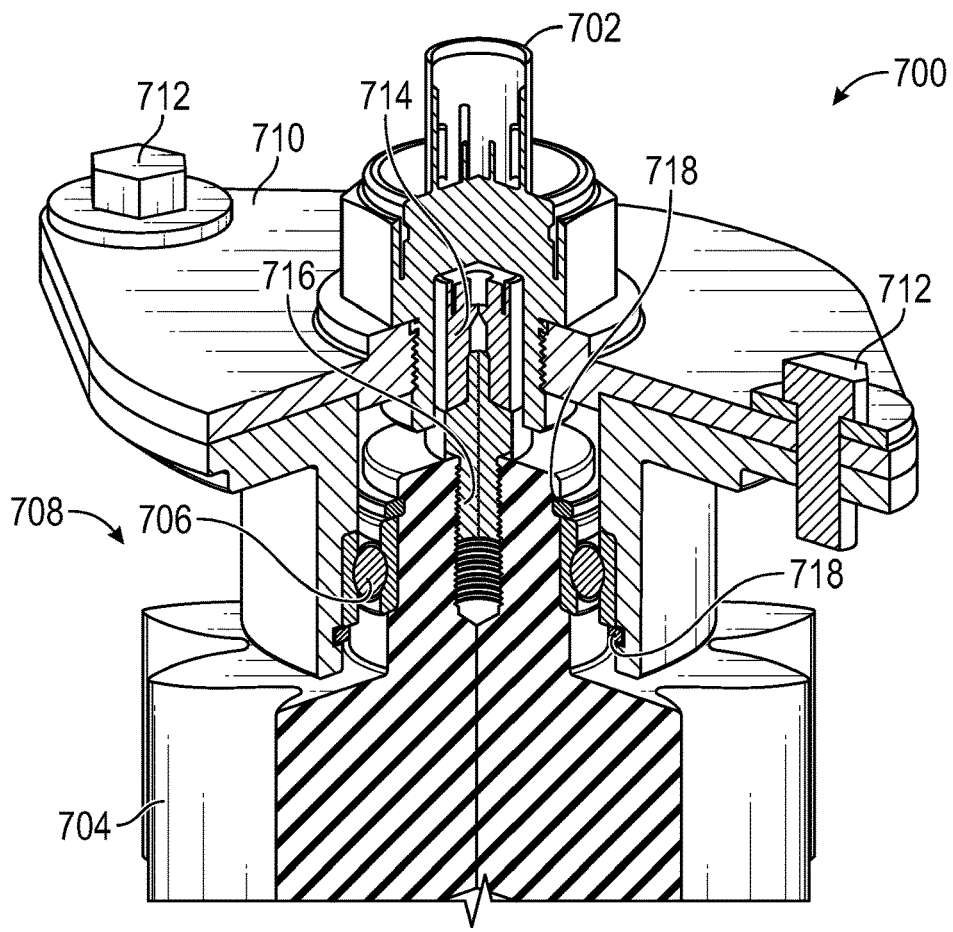
FIG. 7 shows a cutout view of a follower pinion swing sensor assembly in accordance with this disclosure.

FIG. 7 shows a cutout view of a follower pinion swing sensor assembly 700 in accordance with this disclosure. Referring to both FIG. 6 and FIG. 7, sensor 702 reading is driven by pinion rotation of the follower pinion 606, 704, wherein the follower pinion 606, 704 meshes with the teeth of the swing gear 602. The sensor 702 can comprise a magnetic sensor, a contacting sensor, an encoder, or other type of sensor. Dimensions (e.g., the profile) of the follower pinion 606, 704 can coincide with some dimensions of the swing motor pinion 604.

The follower pinion 606, 704 can comprise plastic or similar lightweight but durable material. The plastic can include, for example, nylon plastic, e.g., a Type 6 nylon thermoplastic containing molybdenum disulfide (MoS2), although embodiments are not limited to any particular type of plastic. The plastic material can be lightweight but durable to surrounding environment (dirt, grease, hydraulic oil) & continuous exposed temperatures. The plastic material can be available in rod extrusions allowing the material to be machined with sufficient precision to meet sensor alignment requirements and involute gear shape of the swing gear to prevent backlash. Using this nonmetallic material cuts down on cost (relative to machined steel) and eliminates any ferrous material interaction with the position sensor 702 that would present accuracy limitation.

The sensor 702 can be positioned outside the follower pinion housing 708 on an opposite side of the housing cover 710 from the follower pinion 704. Dimensions (e.g., thickness) of the follower pinion housing 708 or other elements of FIG. 7 can be based on bearing size. A transitional fit condition may be present between one or more ball bearings 706 and the follower pinion housing 708. The ball bearing/s 706 can be provided to allow the pinion 704 to rotate with swing gear 602 (FIG. 6). A press-fit condition may exist between the ball bearing/s 706 and the pinion 704. The follower pinion swing sensor assembly 700 can be mounted with the housing cover 710 using mechanisms such as bolts 712, to the upper frame portion 300 (FIG. 3) or 550 (FIG. 5B) at e.g., aperture 552 (FIG. 5B). Target (e.g., a magnetic target) 714 can mounted on a bolt (e.g., a stud bolt) 716 and within an inner diameter of the follower pinion 704 to be read by the position sensor 702. Retaining rings 718 can be provided for further stability of the follower pinion swing sensor assembly 700.

Figure 8:
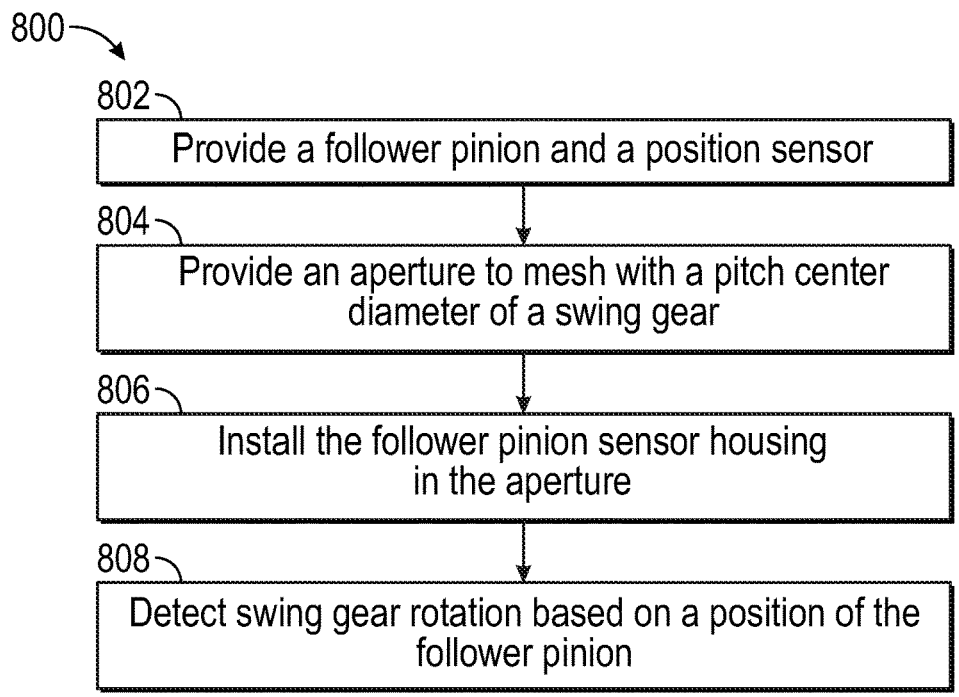
FIG. 8 is a flowchart depicting an example method for sensing swing gear rotation in a work machine in accordance with this disclosure.

FIG. 8 is a flowchart depicting an example method 800 for sensing swing gear rotation in an excavator (e.g., work machine) 100 in accordance with this disclosure. The method 800 can be performed by elements of FIGS. 6-7, including in particular the follower pinion apparatus 600 and position sensor 702.

The method 800 can begin with operation 802 with providing a follower pinion sensor housing including a follower pinion 606 and a position sensor 702. The method 800 can continue with operation 804 with providing an aperture with an upper frame of the work machine, the aperture to mesh with a pitch center diameter of a swing gear system of the work machine.

The method 800 can continue with operation 806 with installing the follower pinion sensor housing in the aperture. A housing cover 710 can be mounted within the aperture and the position sensor 702 can be mounted to the housing cover 710. The method 800 can continue operation 808 with detecting swing gear rotation based on a position of the follower pinion. The follower pinion 606, 704 can be within a same locating diameter as a swing motor pinion 604 of the swing gear system.

INDUSTRIAL APPLICABILITY

In general, excavator 100 can be configured and equipped to detect rotation of a housing with a lower assembly of the excavator 100. For example, a follower pinion 606 can be mounted within swing gear of the excavator 100. The follower pinion 606 can mesh with this swing gear similar to the swing gear pinion such that the follower pinion moves with the swing gear. Therefore, by detecting the position of the follower pinion, swing gear position can be detected. Accuracy and precision are not limited by the number of teeth in the swing gear; instead, measurement is continuous throughout rotation of the swing gear.

The above detailed description is intended to be illustrative, and not restrictive. The scope of the disclosure should, therefore, be determined with references to the appended claims, along with the full scope of equivalents to which such claims are entitled.

LIST OF ELEMENTS 100 excavator
102 upper structure
103 swing gear
104 lower structure
106 working element
108 body
110 operator cab
112 tracks
114 boom
116 arm
118 work tool
120 pivot point
122 boom hydraulic cylinder
124 first end
126 second end
128 arm hydraulic cylinder
130 first end
132 second end
134 work tool hydraulic cylinder
136 bucket linkage assembly 138 first end
140 second end
202 center enclosure panel
300 upper frame portion
302 location
304 hydraulic hoses
306 casting
312 follower pinion
314 swing gear
400 lower frame swivel access panel
402 follower pinion apparatus
404 follower pinion
406 swing gear
500 upper frame portion
502 swivel clearance aperture
504 top section
506 swing motor mounting aperture
508 mounting apertures
550 upper frame portion
552 aperture
600 follower pinion apparatus
602 swing gear
604 swing motor pinion
606 follower pinion
700 follower pinion swing sensor assembly
702 sensor
704 follower pinion
706 ball bearing
708 follower pinion housing
710 housing cover
712 bolts
718 retaining rings

The invention claimed is:

1. A follower pinion apparatus comprising:
a swing gear system comprised of a swing gear and a swing motor pinion;
a nonmetallic follower pinion positioned to mesh with the swing gear;
a sensor configured to sense a position of the follower pinion; and
a follower pinion housing and housing cover, wherein the sensor is outside the follower pinion housing on an opposite side of the housing cover from the follower pinion.

2. The follower pinion apparatus of claim 1, wherein the follower pinion is located on a same pitch center diameter of the swing gear.

3. The follower pinion apparatus of claim 1, wherein the sensor comprises a magnetic sensor.

4. The follower pinion apparatus of claim 3, further comprising a magnetic target mounted within an inner diameter of the follower pinion.

5. The follower pinion apparatus of claim 1, wherein the sensor comprises a contacting sensor.

6. The follower pinion apparatus of claim 5, wherein the follower pinion comprises a Type 6 nylon thermoplastic containing molybdenum disulfide (MoS2).

7. The follower pinion apparatus of claim 5, further comprising ball bearings press-fitted to the follower pinion.

8. The follower pinion apparatus of claim 1, wherein the follower pinion comprises a plastic material.

9. A work machine comprising:
an upper structure and a lower structure;
a swing gear system coupled to the upper structure and to the lower structure, the swing gear system configured to rotate the upper structure over the lower structure using a swing motor; and
an upper frame within the upper structure, the upper frame including a swing sensor aperture at which is mounted a nonmetallic follower pinion assembly.

10. The work machine of claim 9, wherein the follower pinion assembly includes a housing cover and a position sensor mounted to the housing cover.

11. The work machine of claim 9, wherein the swing gear system includes a pitch center diameter and wherein the swing sensor aperture is positioned to mesh to the pitch center diameter.

12. The work machine of claim 9, wherein the upper frame further includes a swivel clearance aperture and a swing motor mounting aperture.

13. The work machine of claim 9, wherein the upper frame further includes a plurality of swing gear/bearing mounting apertures to mount swing gear to the upper frame and a lower frame respectively.

14. The work machine of claim 9, wherein the work machine comprises an excavator.

15. A method for sensing swing gear rotation in a work machine, the method comprising:
providing a follower pinion sensor housing including a nonmetallic follower pinion and a position sensor;
providing an aperture within an upper frame of the work machine, the aperture to mesh with a pitch center diameter of a swing gear system of the work machine;
installing the follower pinion sensor housing in the aperture; and
detecting swing gear rotation based on a position of the follower pinion.

16. The method of claim 15, further comprising:
mounting a housing cover including the position sensor to the upper frame of the work machine.

17. The method of claim 15, further comprising:
providing the follower pinion on a same pitch center diameter of the swing gear.

18. The method of claim 15, wherein detecting swing gear rotation comprises sensing a magnetic target.

19. The method of claim 15, wherein the work machine comprises an excavator.

* * * * *